Feb. 10, 1925.

W. SOCHA

FLAG HOLDER

Filed July 14, 1924

1,525,515

Inventor.
William Socha
by Heard Smith & Tennant.
Attys.

Patented Feb. 10, 1925.

1,525,515

UNITED STATES PATENT OFFICE.

WILLIAM SOCHA, OF CHELSEA, MASSACHUSETTS.

FLAG HOLDER.

Application filed July 14, 1924. Serial No. 725,796.

*To all whom it may concern:*

Be it known that I, WILLIAM SOCHA, a citizen of the United States, and resident of Chelsea, county of Suffolk, State of Massachusetts, have invented an Improvement in Flag Holders, of which the following description, in connection with the accompanying drawing, is a specification, like characters on the drawing representing like parts.

This invention relates to flag holders for automobiles and the like and it has for its object to provide a novel flag holder of simple construction which can be readily clamped to the windshield post, radiator filling opening or some other part of an automobile and by means of which a flag can be supported in different angular positions.

The device comprises a body member arranged to be clamped to some part of the automobile, such for instance, as the windshield post, and a socket member adapted to receive the flagstaff and swivelled to the body member so that it can be turned in different angular positions. Suitable means are also provided for retaining the socket member in its adjusted position.

In order to give an understanding of the invention I have illustrated in the drawings a selected embodiment thereof which will now be described after which the novel features will be pointed out in the appended claim.

Figure 1:
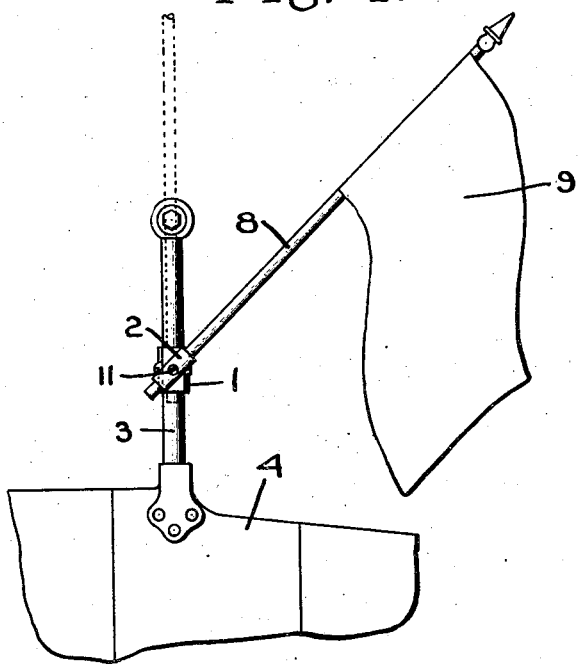
Fig. 1 is a view showing a portion of an automobile with my improved flag holder secured thereto.

The improved flag holder comprises a body member 1 and a socket member 2. The body member 1 is constructed to be clamped to the windshield post, the radiator filling opening or some other part of an automobile 4. In the drawings I have illustrated it as being clamped to the windshield post 3. For this purpose it is preferably made U-shaped as shown and is provided with the two clamping jaws 5 adapted to embrace the windshield post 3 or some other support and to be clamped to said support by the clamping screw 6.

The socket member 2 is provided with a socket 7 to receive the flagstaff 8 of a flag 9. The socket 7 extends clear through the socket member so that the flagstaff can be placed at any desired elevation and the flagstaff is clamped in position by means of a clamp 10 which is situated inside of the socket 7 and is clamped against the flagstaff by means of a clamping screw 11.

The socket member 2 is swivelled to the body 1 so as to permit the flag to be turned into different angular positions. For this purpose the socket member is formed with a stem 12 which extends through and is swivelled in an opening 13 formed in the member 1, said stem constituting a pivot or axis about which the socket member can be turned. The socket member is shown as having a flat face 14 which rests against a flat face 15 formed on the member 1 thereby providing a firm bearing for the socket member.

For holding the socket member in different angular positions the latter is provided with a positioning pin 16 which is adapted to enter into any one of a number of apertures 17 formed in the body 1.

Figure 2:
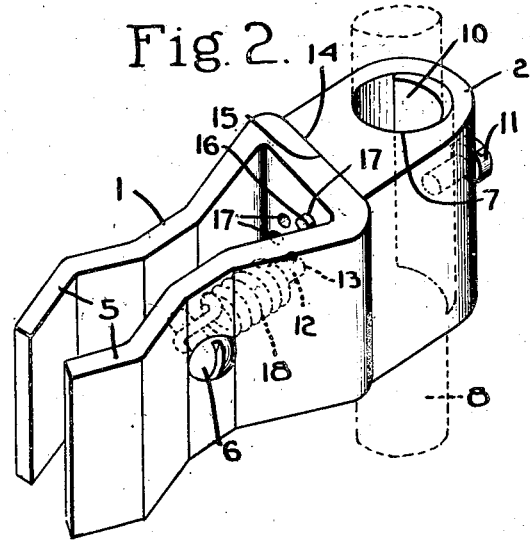
Fig. 2 is a perspective view of the flag holder.

The socket member is yieldingly held against the face 15 by means of a spring 18 which is herein shown as having one end connected to the stem 12 and having its other end connected to the clamping bolt 6. This spring normally acts to hold the socket member in the position shown in Fig. 2 and in the full lines shown in Fig. 3 but it permits the socket member to be moved away from the face 15 in order to withdraw the positioning pin 16 from the aperture 17 in which it is located.

Figure 3:
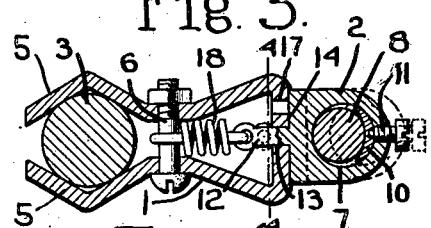
Fig. 3 is a horizontal section through the flag holder.
Figure 4:
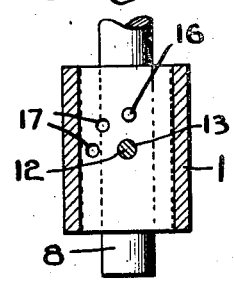
Fig. 4 is a section on the line 4—4, Fig. 3.

After the socket member has been pulled outwardly into the dotted line position Fig. 3 so as to free the pin 16 from the aperture 17 then said socket member may be turned about the stem 12 as an axis into a different angular position.

When the flag has given the desired angular position the pin 16 may be re-entered into one of the apertures 17 thus locking the socket member in its adjusted position. Said socket member will be held locked in this position by the action of the spring 18 and the pin 16.

The device can be inexpensively made, it can be easily clamped in position on the automobile, and after it is in place and the flag is located in the socket member, the latter can be easily adjusted to place the flag at any desired angle.

In Fig. 1 the flag is shown in full lines with the flagstaff at about a 45° angle and in dotted lines the flagstaff is shown as extending vertically. The flag may be given as many other positions as there are apertures 17 and the member 1 may be provided with any desired number of apertures.

While I have shown in the drawings a socket member adapted to hold a single flag yet it is within my invention to employ a socket member having a plurality of sockets so that a plurality of flags may be retained thereby.

While I have illustrated herein a selected embodiment of my invention I do not wish to be limited to the constructional features shown.

I claim.

A flag holder for automobiles and the like comprising a body member having two arms adapted to receive between them the windshield post, neck of the radiator filling opening or some other part of the automobile, said body member having a flat vertically-extending face at one end, a clamping screw connecting said arms and by which they are clamped to the windshield post or other part of the automobile, a socket member having a socket to receive a flagstaff, and also having a flat face bearing against the flat face of the body member, said socket member having a stem extending through an aperture in said face, said stem being turnable in said aperture, a spring connecting said stem and clamping bolt, said flat face of the body member having a plurality of apertures therein, and the socket member having a pin and adapted to be received in any one of said apertures, said pin being held yieldingly in the aperture by the spring.

In testimony whereof, I have signed my name to this specification.

WILLIAM SOCHA.